United States Patent
Griffin et al.

[11] Patent Number: 6,161,934
[45] Date of Patent: Dec. 19, 2000

[54] HALO ELIMINATING AUTOMOTIVE INDICATOR ASSEMBLY

[75] Inventors: Ranald L. Griffin, Livonia; Jerome M. Kosiba, Allen Park; Sandra Perlaki, Highland, all of Mich.

[73] Assignee: DaimlerChrysler Corporation, Auburn Hills, Mich.

[21] Appl. No.: 09/356,123

[22] Filed: Jul. 16, 1999

[51] Int. Cl.[7] .................................................. G01D 11/28
[52] U.S. Cl. .................................. 362/26; 362/23; 362/29
[58] Field of Search ................................ 362/23, 26, 24, 362/559, 489

[56] References Cited

U.S. PATENT DOCUMENTS 5,531,181  7/1996  Cookingham ........................ 116/288
5,829,861  11/1998  Carter et al. ........................ 362/29

*Primary Examiner*—Stephen Husar
*Assistant Examiner*—Ismael Negron
*Attorney, Agent, or Firm*—Roland A. Fuller, III

[57] ABSTRACT

An indicator assembly includes a dial assembly and a pointer assembly. The dial assembly includes an opaque outer member and a translucent inner member with tapered walls. The pointer assembly includes a translucent pointer and a opaque light collecting member. The translucent pointer is adapted to be mounted for rotation relative to the dial assembly about a pivot axis. The opaque light collecting member is attached to the end of the pointer and includes a light blocking wall radially extending around the end which defines a light collecting cavity that receives the end of the pointer.

19 Claims, 1 Drawing Sheet

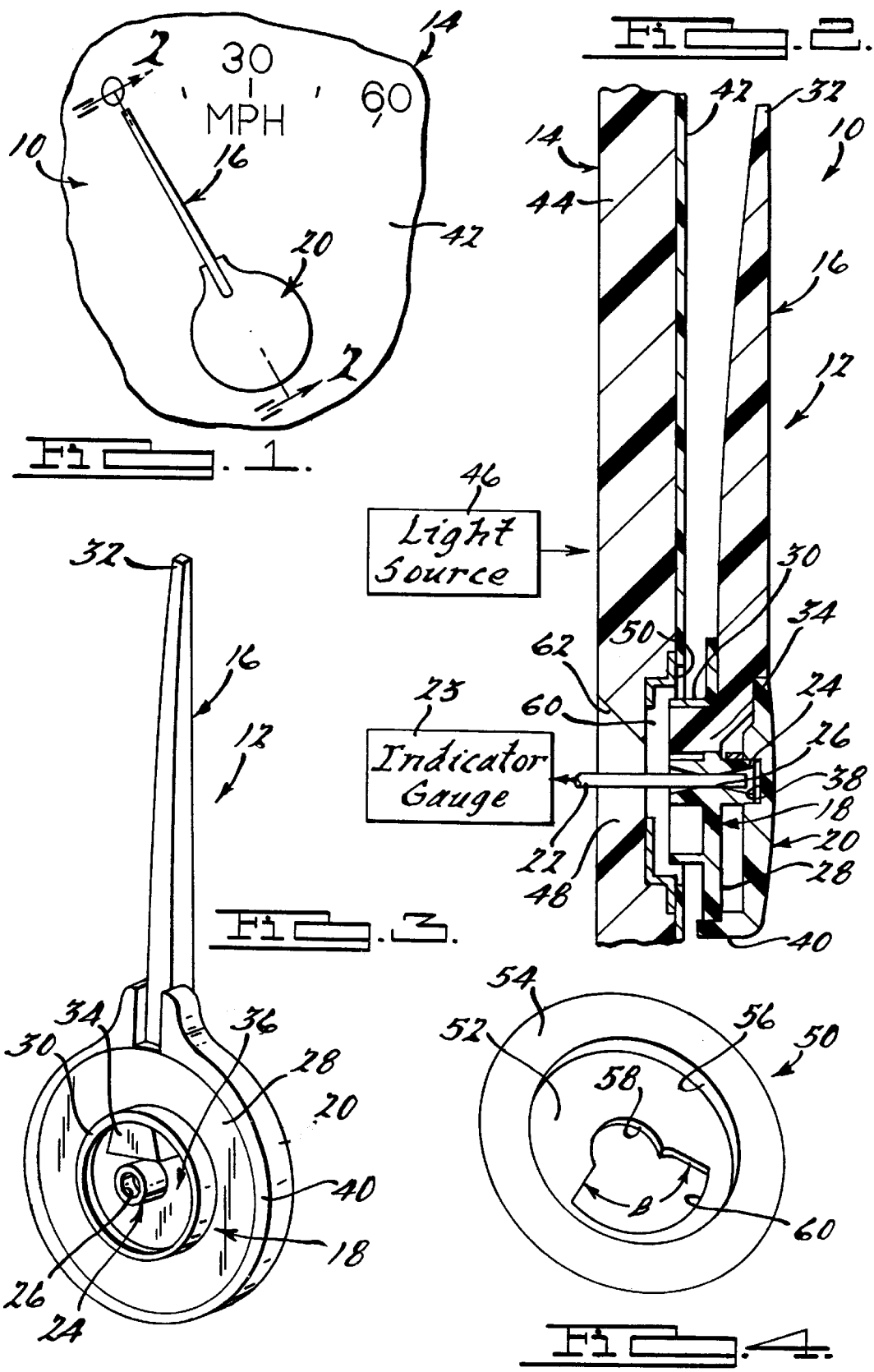

HALO ELIMINATING AUTOMOTIVE INDICATOR ASSEMBLY

BACKGROUND OF THE INVENTION

1. Field of the Invention

The present invention relates generally to automotive indicator assemblies. More particularly, the present invention relates to an arrangement for eliminating the halo effect around the perimeter of an illuminated pointer of an automotive indicator assembly.

2. Discussion of the Related Art

In the automotive industry, indicator assemblies are customarily used to relate a vast amount of information to drivers such as vehicle speed, fuel level, oil level, etc. Such indicator assemblies are often illuminated in order for drivers to be able to view them at night or in other dimly lit conditions. Illuminated indicator assemblies have therefore become quite common in the industry and presently are available in many different forms. Combining illumination with innovative dial coloring has recently become a topic of interest as automobile designers attempt to make the interior of the vehicle as visually pleasing and functional as possible.

A problem arises, however, particularly with lighter colored dials including but not limited to white, cream, and tan shaded dials. This problem is generally termed the halo effect, which appears around the perimeter of the dial pointer due to excess illumination. Typically, a pointer assembly including a pointer is mounted in the indicator assembly. The pointer is capable of carrying light which is sourced-in from a dial assembly at various light pick-up points. Light enters the pointer through an angled light guide located at the base of the pointer assembly. The pointer collects some of the light entering the pointer assembly and uses it for illumination. A visually unacceptable effect results from light not collected by the pointer which escapes from the interior of the dial assembly. This escaping light often becomes visible around the perimeter of the pointer and creates the aforementioned halo effect. This effect is aggravated by the high reflectivity of the lighter dial colors. The halo effect can distract the driver and is cosmetically unappealing. It is therefore desirable to eliminate all excess light not required to illuminate the pointer and efficiently collect all desired light so that the halo effect can be avoided regardless of the dial color.

SUMMARY OF THE INVENTION

It is a general object of the present invention to provide an illuminated indicator assembly for a motor vehicle which substantially reduces or eliminates the halo effect resulting from escaping light.

In one form, the present invention provides an indicator assembly including a dial assembly and a pointer assembly. The pointer assembly includes a translucent pointer and an opaque light collecting member. The translucent pointer is adapted to be mounted for rotation relative to the dial assembly about a pivot axis. The pointer includes a main body and an end. The opaque light collecting member is attached to the pointer. The light collecting member defines a light collecting cavity. The light collecting cavity receives the end of the pointer. The light collecting member includes a light blocking wall radially extending around the end of the pointer.

In another form, the present invention provides an indicator assembly generally including a dial assembly and a pointer assembly. The dial assembly includes a dial and an opaque light blocking member. The dial has a dial opening through which a pivot shaft passes. The pivot shaft is adapted to be interconnected to a gauge. The pointer assembly includes a translucent pointer and a light collecting cavity. The translucent pointer is interconnected to the pivot shaft for rotation relative to the dial through an active arc about a pivot axis defined by the pivot shaft. A light source is disposed behind the dial assembly. The opaque light blocking member is attached to the dial assembly and defines a window for limiting the transmission of light from the light source to the light collecting cavity.

Further objects, features and advantages of the invention will become apparent from a consideration of the following description and the appended claims when taken in connection with the accompanying drawings.

BRIEF DESCRIPTION OF THE DRAWINGS

Various advantages of the present invention will become apparent to one skilled in the art by reading the following specification and subjoined claims and by referencing the following drawings in which:

FIG. 1 is a front view of an automotive indicator assembly constructed in accordance with the teachings of a preferred embodiment of the present invention.

FIG. 2 is a cross-sectional view taken along the line 2—2 shown in FIG. 1.

FIG. 3 is a rear and side perspective view of the pointer assembly according to the present invention.

FIG. 4 is an enlarged perspective view of the light blocking member according to the present invention.

DETAILED DESCRIPTION OF THE PREFERRED EMBODIMENT

The following discussion directed to the elimination of the halo effect in automotive indicator assemblies is merely exemplary in nature, and is in no way intended to limit the invention or its applications or uses.

Turning generally to FIGS. 1–4, an indicator assembly constructed in accordance with the teachings of the preferred embodiment of the present invention is identified generally at 10. In the exemplary embodiment illustrated, the indicator assembly is an automotive indicator assembly 10 for relaying information to the driver. In one particular application, the indicator assembly 10 is a speedometer used to relay information regarding vehicle speed. However, it will be readily understood that the teachings of the present invention are equally applicable for virtually any type of illuminated indicator assembly.

The indicator assembly 10 is shown to generally include a pointer assembly 12 and a dial assembly 14. The dial assembly 14 is operatively associated with the pointer assembly 12 and is provided with indicia indicative of vehicle speed, for example. However, it will be understood that the pointer assembly 12 may alternatively linearly translate relative to the dial assembly 14. As will be discussed further below, the pointer assembly 12 is mounted for relative rotation to the dial assembly 14. The indicator assembly 10 is interconnected to a conventional speed sensing device (not shown) in a conventional manner.

The pointer assembly 12 is shown to generally include a pointer 16, a light collecting member 18 and a hub 20. The light collecting member 18 receives a pivot pin or pivot shaft 22. The pivot pin 22 is rotatably mounted in a conventional manner behind the dial assembly 14 to an indicator gauge 23. In the exemplary arrangement, the pivot pin 22 thereby defines an axis about which the pointer assembly 12 pivots in response to a change in vehicle speed.

In the exemplary embodiment, the light collecting member 18 is integrally formed to include a generally cylindrical central portion or bushing portion 24 defining an axially extending aperture 26 for receiving the pivot pin 22 in a press fit manner. As such, the light collecting member 18 rotates with the pivot pin 22. The light collecting member 18 is preferably integrally formed to further include a radially extending flange 28. The light collecting member 18 additionally includes an axially extending circumferential flange 30 which is co-eccentrically oriented with respect to the cylindrical central portion 24. The light collecting member 18 is preferably unitarily constructed from an opaque material. In one particular application, the light collecting member 18 is constructed from an opaque plastic material.

The pointer 16 radially extends from the light collecting member 18. The pointer 16 includes a first end or indicating end 32 and a second end or light receiving end 34. In the exemplary embodiment, the light receiving end 34 extends axially relative to a center or main body of the pointer 16. The pointer 16 is constructed of a translucent material, such as but not limited to a translucent plastic material. As seen most clearly in FIG. 4, the light receiving end 34 of the pointer 16 axially extends rearwardly from a main body of the pointer 16 and is received within a portion of a light collecting cavity 36 defined between the cylindrical central portion 24 and the axially extending circumferential flange 30. The light collecting cavity 36 is preferably illustrated as a circular channel.

The hub 20 is generally circular in shape. A rear side of the hub 20 is formed to include a centrally located cylindrical recess 38 for receiving an end of the central portion 24 of the light collecting member 18. In one application, the central portion 24 is received within the cylindrical recess 38 in a press fit manner. The hub 20 radially extends beyond the light collecting member 18 and includes a rearwardly extending cylindrical flange 40. In one application, the hub 20 is constructed of a plastic material.

The dial assembly 14 is shown to include an overlay 42 and a dial 44. The overlay 42 is adhesively or otherwise suitably secured to the dial 44. The overlay 42 carries the indicia relating to vehicle speed and is constructed of an opaque material, such as an opaque plastic. The dial 44 is constructed of a translucent material, such as translucent plastic. In a conventional manner, the dial 44 receives light from a light source 46 disposed rearwardly of the dial assembly 14 at various light pick-up points (not specifically shown). The dial 44 is capable of carrying this sourced-in light. The dial 44 includes a dial opening 48 through which the pivot pin 22 passes. The dial opening 48 is shown to preferably taper in a direction towards the pointer 16.

With particular reference to FIGS. 2 and 4, the present invention is further shown to include a light blocking member 50 constructed of an opaque material, including but not limited to plastic or metal. The light blocking member 50 is illustrated to include a central planar surface or light rejection surface 52 and a radially extending circumferential flange 54 interconnected by an axially extending portion 56. As illustrated in FIG. 4, the radially extending cylindrical flange 54 of the light blocking member 50 is captured between the overlay 42 and the dial 44 of the dial assembly 14. Alternatively, the light blocking member 50 may be adhesively or otherwise securely attached to the dial assembly 14. The light blocking member 50 is illustrated disposed between the dial 44 and the light collecting member 18.

The light rejection surface 52 includes a central aperture 58 through which the pivot pin 22 passes. The light rejection surface 52 further includes a window 60 for allowing light from the light source 46 to selectively pass. The window 60 is preferably an arcuate window which extends through a predetermined angle $\beta$. The predetermined angle $\beta$ preferably corresponds with the range of motion or active arc of the pointer 16. In one application, the predetermined angle $\beta$ is approximately 60°.

In operation, light from the light source 46 passes through the dial 44 of the dial assembly 14, through the central opening 50 and window 60 of the light blocking member 50 and into the light receiving end 34 of the pointer 16. This light received by the light receiving end 34 of the pointer 16 readily illuminates the entire length of the pointer 16. As will be described, the light from the light source 46 is focused to the pointer 16 and excess light which would otherwise produce a halo effect is eliminated. Light from the light source 46 entering the dial 44 of the dial assembly 14 and passing through the dial 44 in a direction parallel to the pointer 16 is reflected by tapered walls 62 which define the dial opening 48. The walls 62 are preferably tapered at an angle of approximately 45°. As a result, the light traveling within the translucent dial 44 of the dial assembly 14 is reflected in a normal direction toward the pointer 16.

The light blocking member 50 functions to exclude source light which is outside the active arc of the pointer 16. The active arc is defined by all positions along a perimeter of the indicator assembly 10 in which values are indicated. The window 60 permits source light which is inside the active arc to enter the indicator assembly 10 and subsequently become contained transmitted light. The light collecting cavity 36 defined between the central portion 24 and the outer cylindrical flange 30 contains the light which is collected by the pointer 16.

In the exemplary embodiment, the flange 30 of the light collecting member 18 axially extends in a rearward direction beyond a front face of the light blocking member 50. In addition, the flange 30 axially extends so as to be flush with the second end 34 of the pointer 16. In this manner, light from the light source 46 cannot readily escape between the pointer assembly 12 and the dial assembly 14 to otherwise create a halo effect. In this regard, the flange 30 and the cylindrical portion 24 effectively define light blocking walls in between which the light receiving end 34 of the pointer 16 is disposed.

With the present invention, excess source light is separated from transmitted light to reduce the amount of transmitted light to only that which is needed during normal operation of the indicator assembly 10. Separation takes place with the light blocking member 50. Desired transmitted light passes through the window 60 and is contained within the cavity 36 until the rotating pointer 16 collects the light for illumination.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An indicator assembly comprising:
   a dial assembly including an opaque outer member and a translucent inner member, said translucent inner member including a pair of tapered walls defining a dial opening; and
   a pointer assembly including a pivot shaft passing through said dial opening, a translucent pointer and an opaque light collecting member, said translucent pointer adapted to be mounted for rotation relative to said dial about a pivot axis, said pointer including a main body and an end, said opaque light collecting member attached to said pointer, said light collecting member defining a light collecting cavity, said light collecting cavity receiving said end of said pointer, said light collecting member including a light blocking wall radially extending around said end.

2. The indicator assembly of claim 1, wherein said light blocking wall comprises a continuous cylindrical flange.

3. The indicator assembly of claim 1, wherein said light collecting member further includes an aperture for receiving a pivot pin.

4. The indicator assembly of claim 1, wherein said light collecting cavity is defined by an inner cylindrical portion and an outer cylindrical flange.

5. The indicator assembly of claim 1, wherein said inner cylindrical portion and said outer cylindrical flange are interconnected by a radial extending portion.

6. The indicator assembly of claim 1, wherein said radially extending portion radially extends beyond said outer cylindrical flange.

7. The indicator assembly of claim 1, wherein said outer cylindrical flange axially extends beyond a front face of said dial assembly.

8. The indicator assembly of claim 1, wherein said end of said pointer extends axially relative to said main body, and further wherein said light blocking wall blocks the escapement of light through said end of said pointer in a direction normal to said pivot axis.

9. An indicator assembly comprising:
   a dial assembly including a dial having a dial opening and an opaque light blocking member;
   a pivot shaft passing through said dial opening and adapted to be attached to a gauge;
   a pointer assembly including a translucent pointer and a light collecting cavity, said translucent pointer interconnected to said pivot shaft for rotation relative to said dial through an active arc about a pivot axis defined by said pivot shaft, said translucent pointer including an end disposed in said light collecting cavity; and
   a light source disposed behind said dial assembly;
   said opaque light blocking member attached to said dial assembly, said light blocking member defining a window for limiting the transmission of light from said light source to said light collecting cavity;
   wherein said dial includes an opaque outer member and a translucent inner member, said translucent inner member including a pair of tapered walls defining said dial opening.

10. The indicator assembly of claim 9, wherein said active arc has a predetermined angle and said window is an arcuate window extending through a corresponding predetermined angle.

11. The indicator assembly of claim 9, wherein said light blocking member includes a rejection surface for excluding light which is outside said active arc, and said window is contained within the rejection surface for permitting light which is inside the active arc to enter said dial assembly.

12. An indicator assembly for a motor vehicle, the indicator assembly comprising:
   a dial assembly including a dial opening and an opaque light blocking member;
   a pointer assembly including a translucent pointer and an opaque light collecting member, said translucent pointer including a main body and an end, said opaque light collecting member defining a light collecting cavity, said light collecting cavity receiving said end of said pointer;
   said opaque light blocking member attached to said dial assembly, said light blocking member defining a window for limiting the transmission of light from said light source to said translucent pointer;
   a light source disposed behind said dial assembly; and
   a pivot shaft passing through said dial opening, said pivot shaft including a first end adapted to be attached to an indicator gauge and a second end fixedly interconnected to said translucent pointer such that rotation of said pivot shaft rotates said translucent pointer relative to said dial assembly;
   wherein the light blocking member is disposed between the pointer assembly and the light source.

13. The indicator assembly of claim 14, wherein said light collecting cavity is a circular channel.

14. The indicator assembly of claim 12, wherein said pointer includes a main body and an end axially extending relative to said main body, said end operative for receiving light from said light source to illuminate said pointer.

15. The indicator assembly of claim 14, wherein said light collecting member includes a light blocking wall for blocking the escapement of light through said end of said pointer in a direction normal to said pivot shaft.

16. The indicator assembly of claim 15, wherein said light blocking wall comprises a continuous cylindrical flange.

17. The indicator assembly of claim 14, wherein said light blocking member includes a light rejection surface covering said dial opening, said window defined in said light rejection surface.

18. The indicator assembly of claim 17, wherein said window is an arcuate window.

19. The indicator assembly of claim 18, wherein said translucent pointer is operative within an active arc having an angular length substantially equal to an angular length of said arcuate window.

\* \* \* \* \*